United States Patent [19]

Rieder

[11] 4,430,493

[45] Feb. 7, 1984

[54] PROCESS FOR THE PREPARATION OF AROMATIC POLYESTERS

[75] Inventor: Werner Rieder, Vienna, Austria

[73] Assignee: Isovolta Oesterreichische Isolierstoffwerke Aktiengesellschaft, Wiener Neudorf, Austria

[21] Appl. No.: 463,590

[22] Filed: Feb. 3, 1983

Related U.S. Application Data

[63] Continuation-in-part of Ser. No. 260,939, May 6, 1981, abandoned.

[30] Foreign Application Priority Data

May 7, 1980 [AT] Austria .............................. 2425/80
May 7, 1981 [EP] European Pat. Off. ........ 81890076.3

[51] Int. Cl.$^3$ .............................................. C08G 63/18
[52] U.S. Cl. .................................... 528/179; 528/176; 528/182; 528/190; 528/194
[58] Field of Search ..................... 528/176, 179–182, 528/190, 191, 193, 194

[56] References Cited

U.S. PATENT DOCUMENTS

| | | | |
|---|---|---|---|
| 3,216,970 | 11/1965 | Conix | 528/191 |
| 3,234,167 | 2/1966 | Sweeny | 528/191 |
| 4,066,623 | 1/1978 | Besso et al. | 528/191 |
| 4,201,855 | 5/1980 | Segal | 528/191 |

Primary Examiner—Lester L. Lee
Attorney, Agent, or Firm—Hammond & Littell, Weissenberger and Muserlian

[57] ABSTRACT

In an improved process for the preparation of aromatic polyesters by polycondensation of diphenols with aromatic dicarboxylic acid halides such as isophthalic acid chloride and/or terephthalic acid chloride, by a two-phase interface polycondensation method wherein a fine dispersion is produced from an aqueous phase consisting of a solution of diphenol, alkali metal hydroxide for the formation of the alkali metal diphenolate in a stoichiometric ratio or in a slight excess and a phase transfer catalyst like triethylbenzylammonium chloride, tetrabutyl ammonium iodide or crown ether in a mixture of water and an organic solvent as a solubilizer with the organic liquid phase consisting of a solution of the acid chloride in a halogenated solvent, where the diphenolate, transferred to the liquid phase by the phase transfer catalyst, reacts with the acid chloride in a polycondensation reaction for the formation of the polyester, and the polyester formed remains dissolved in the organic phase the improvement comprising using as the solubilizer an alkanol of 2 to 5 carbon atoms or an alkoxy alkanol of 2 to 5 carbon atoms and polyester esters produced thereby.

4 Claims, No Drawings

PROCESS FOR THE PREPARATION OF AROMATIC POLYESTERS

PRIOR APPLICATION

This application is a continuation-in-part application of our copending, commonly assigned U.S. patent application Ser. No. 260,939 filed May 6, 1981, now abandoned.

STATE OF THE ART

U.S. Pat. Nos. 3,216,970 and 3,546,165 describe polycondensation of aromatic phenols and aromatic dicarboxylic acid halides and the polyesters produced thereby. U.S. Pat. No. 3,216,970 has a two phase interfacial polycondensation reaction using dioxane as a cosolvent in the aqueous phase. The alkali metal diphenolates are mostly soluble in water but the solubility of diphenolates in water alone at room temperature is very low, especially those having a central carbon atom in which groups linked thereto are hindered in their free rotations. Since the two phase polycondensation is effected generally at about room temperature, it was necessary to use very low concentrations of alkali metal diphenolates. Moreover, some diphenolates have a very low water solubility at room temperature.

Solubilizers such as dioxane or tetrahydrofuran were added to the aqueous phase to increase diphenolate solubility since they are cyclic ethers which are inert under the reaction conditions. However, they are relatively expensive and create problems due to their high degree of toxicity, especially when used on a commercial scale.

The polyesters based on 1,1-bis-(4-hydroxyphenyl)-1-phenylethane and 9,9-bis(4-hydroxyphenyl)-fluorene described in U.S. Pat. Nos. 3,216,970 and 3,546,165 have relatively low molecular weights as can be seen from their low intrinsic viscosity characteristics which are in the range of 0.8 to 1.0 dl/g as determined in Example 1 of this application. Only in exceptional cases, such as Example XXVII of U.S. Pat. No. 3,564,165, obtained higher intrinsic viscosities. Polyesters of this type are not suitable for film casting since their mechanical properties are not satisfactory.

U.S. Pat. No. 4,201,855 describes an interfacial polycondensation reaction wherein the bisphenol is dissolved in a mixture of an alkali metal hydroxide and a polyhydroxy derivative of a liquid aliphatic hydrocarbon, ether or amine. Examples 1 and 2 use a mixture of water, sodium hydroxide and ethylene glycol and the patentee assumes a copolymerization with a small amount of ethylene glycol although at the end of column 4 he states that the hydroxyl groups of this polyhydroxy compound are less active than the bisphenols in the polycondensation.

In lines 16 to 21 of column 5 of the patent, it is stated that it is possible to replace the water in the solvent mixture with a solvent such as methanol or other solvents which do not take part in the ester forming reaction. However, methanol does effect the polycondensation as it is a chain stopper in the polycondensation reaction.

OBJECTS OF THE INVENTION

It is an object of the invention to provide an improved process for the polycondensation of aromatic diphenols and aromatic dicarboxylic acid halides.

It is another object of the invention to provide novel polyesters with high inherent viscosities.

These and other objects and advantages of the invention will become obvious from the following detailed description.

THE INVENTION

The improvement of the process of the invention for the preparation of aromatic polyesters by a two phase interfacial polycondensation wherein a fine dispersion is produced from an aqueous phase consisting of a diphenol, an approximately stoichiometric amount of an alkali metal hydroxide and a phase transfer catalyst in a mixture of water and an organic solubilizer and an organic phase of a solution of at least one aromatic dicarboxylic acid halide in a halogenated organic solvent with the polyester being dissolved in the organic phase comprises using as the organic solubilizer an alkanol of 2 to 5 carbon atoms or an alkoxy alkanol of 2 to 5 carbon atoms.

It has been found that it is not necessary to use solubilizers which are completely inert to the reaction conditions wherein acid chlorides are used in the organic phase but the reactivity of the solubilizers must be very low as compared to the reactivity of the diphenolates polycondensed with the acid chlorides.

Examples of suitable solubilizers used in the process of the invention are alkanols such as ethanol, propanol, isopropanol, butanol, pentanol and isobutanol and alkoxy-alkanols such as methoxyethanol, methoxypropanol, etc. or mixtures thereof.

The polycondensation process of the invention has the advantage that the solubilizers are inexpensive and easier to handle since they are less toxic than other solubilizers such as dioxane. Moreover, the polyesters produced in the process of the invention have higher molecular weights and are obtained in a reproducible manner.

The said polyesters are useful for making films which have the advantage of having excellent mechanical properties and due to the uniform molecular weight of the polyesters, the quality of the films produced therefrom is uniform.

Among the preferred diphenols useful in the process of the invention are 1,1-bis-(4-hydroxyphenyl)-1-phenylethane and 9.9-bis-(4-hydroxyphenyl)-fluorene since the polyesters thereof have a high inherent viscosity and good elongation at break properties in films produced therefrom. Preferably, the aromatic dicarboxylic acid halides used to prepare polyesters of the said diphenols are terephthalic acid chloride and/or isophthalic acid chloride.

The said polyesters will form films with an inherent viscosity beginning at about 0.4 dl/g and the elongation at break values of films of 1,1-bis-(4-hydroxyphenyl)-1-phenylethane increase much faster with increasing inherent viscosity values and attains a higher maximum value, even with particularly high inherent viscosity values, than in the elongation at break values of films made of 9,9-bis-(4-hydroxyphenyl)-fluorene but the relative increments of the elongation at break are substantially the same for polyesters of both diphenols in the same inherent viscosity range. However, for both polyesters, the elongation at break increases significantly with increasing inherent viscosity.

In a preferred mode of the process, the solubilizer is used in a 5 to 25% by weight based on the water and the organic solvent is a liquid halogenated aliphatic hydrocarbon such as dichloromethane or 1,2-dichloroethane or methylene chloride.

In the following examples there are described several preferred embodiments to illustrate the invention. However, it should be understood that the invention is not intended to be limited to the specific embodiments.

EXAMPLE 1

2.0 liters of isopropanol were added to a solution of 264 g of sodium hydroxide in 4 liters of distilled water and 871 g of (3.0 moles) of 1,1-bis-(4-hydroxyphenol)-1-phenylethane with a melting range of 189°–191° C. (measured on an Kofler block) were added to the mixture which was heated at 70° C. until dissolution occurred. The mixture was cooled to room temperature and 8 liters of distilled water were added to the clear sodium diphenolate solution.

304.5 (1.5 moles) of isophthalyol chloride and 304.5 g (1.5 moles) of terephthaloyl chloride were dissolved at room temperature in 2.0 liters of 1,2-dichloroethane which had been dried, distilled and stored in the absence of moisture. A catalyst solution was prepared by dissolving 34.5 g (0.15 moles) of benzyl triethylammonium chloride at room temperature in 200 ml of distilled water.

The diphenolate solution was added to a coolable reaction vessel equipped with a high speed stirrer, a thermometer and dosing pump and then 15 liters of distilled 1,2-dichloroethane and the catalyst solution were admixed therewith with intensive stirring. The acid chloride solution formed above was added with continued intensive stirring over 25 minutes to the dispersion by the dosing pump while keeping the temperature below 40° C. The mixture was stirred for 40 minutes during which the viscosity of the dispersion increased. The polycondensation was complete and the polyester formed dissolved in the organic phase of the dispersion.

The dispersion stood for 15 minutes during which the aqueous and organic phases separated and the aqueous, highly alkaline phase was discarded. The highly viscous organic phase was washed three times with 30 liters of water each time and was vigorously mixed with 30 liters of isopropanol to precipitate the polyester. To remove any residual 1,2-dichloroethane, the polyester was reacted with another 30 liters of isopropanol and the mixture was centrifuged and the polyester was washed in the centrifuge twice with 10 liters of water to obtain a chloride-free polyester. The polyester was dried in a circulating hot air oven at 130° C. for 15 hours to obtain 1,197 g (95% yield) of the polyester with a constant weight.

The inherent viscosity of the polyester was determined with a solution of 0.5 g of the polyester in 100 ml of a mixture of 60% phenol and 40% tetrachloroethane with a Ubbelohde viscosimeter (capillary constant 0.01) at 30° C. The inherent viscosity was 2.0 dl/g.

EXAMPLE 2

The procedure of Example 1 was repeated using 2.0 liters of ethanol in place of the isopropanol solubilizer and 1,210 g (96% yield) of polyester having an inherent viscosity of 1.65 dl/g were obtained.

EXAMPLE 3

2.5 liters of isopropanol were added to a solution of 264 g of sodium hydroxide in 5.0 liters of distilled water and 1,051 g (3.0 moles) of 9,9-bis-(4-hydroxyphenyl)-fluorene with a melting range between 228°–230° C. were added to the mixture which was heated to 70° C. to effect dissolution. The mixture was cooled to room temperature and 1.0 liter of distilled water was added thereto. The mixture was then processed as in Example 1, to obtain 1,383 g (96% yield) of the polyester having an inherent viscosity of 1.73 dl/g.

EXAMPLE 4

Using the procedure of Example 1, 2.0 liters of isopropanol were added to a solution of 249.0 g (6.225 moles) of sodium hydroxide in 18.0 liters of distilled water and 871.09 g (3.0 moles) of 1,1-bis-(4-hydroxyphenyl)-1-phenylethane with a melting range of 188° to 190° C. were dissolved therein. The catalyst solution was formed by dissolving 17.25 g (0.075 moles) of benzyl triethylammonium chloride in 200 ml of water. The acid chloride solution was formed by dissolving 609.0 g (3 moles) of 1-1 mixture of isophthaloyl chloride and terephthaloyl chloride in 12.0 liters of 1,2-dichloroethane.

The diphenolate solution and the catalyst solution were mixed with stirring as in Example 1 and the organic solution was dispersed therein with intensive stirring over five minutes and the mixture was stirred another 20 minutes at 20° to 25° C. After this time the polycondensation was complete with the polyester in the organic phase. The organic phase was treated as in Example 1 to obtain 1,203 g (95% yield—2.86 moles) of the polyester was an inherent viscosity of 2.23 dl/g.

For comparison purposes, the said procedure was repeated using 2.0 liters of ethylene glycol in the place of isopropanol as the solubilizers and 1,233 g (98% yield) of polyester were obtained but the polyester had an inherent viscosity of only 1.14 dl/g, which is about half that of the process of the invention.

EXAMPLE 5

Using the procedure of Example 1, 100 ml of isopropanol were added to a solution of 16.6 g (0.415 mole) of sodium hydroxide in 500 ml of water and 58.07 g (0.2 mole) of 1,1-bis-(4-hydroxyphenyl)-1-phenylethane with a melting range of 188° to 190° C. were dissolved there. 2.30 g (0.01 mole) of benzyl triethylammonium chloride were added as the phase transfer catalyst with intensive stirring. The acid chloride solution of 40.61 g (0.2 mole) of a 1-1 mixture of isophthaloyl chloride and terephthaloyl chloride in 100 ml of 1,2-dichloroethane was dispersed therein with intensive stirring which was maintained for another 20 minutes. The mixture was treated as in Example 4 to obtain a polyester with an inherent viscosity of 1.51 dl/g.

The procedure was repeated using 400 ml of water and 100 ml of methanol in place of the 500 ml of water and 100 ml of isopropanol to obtain a polyester with an inherent viscosity of only 0.31 dl/g. Moreover, precipitation of the polyester was very difficult. It is not fully understood why methanol does not give so good results as isopropanol or ethanol do.

EXAMPLE 6

0.2 mole (58 gm) of 1,1-bis-(4-hydroxyphenyl)-1-phenylethane in 700 ml of water, 50 ml of ethanol, and 0.415 mole (16.6 g) of sodium hydroxide were dissolved by heating according to the invention for the production of the aqueous phase. After cooling, a solution of 0.0175 mole (4 g) of triethylbenzyl ammonium chloride in 25 ml of water were added to the solution as a phase transfer catalyst.

This solution forming the aqueous phase was then mixed with 400 ml of 1,2-dichloroethane and the mixture was dispersed with a high-speed stirrer. To this dispersion was then added as an organic liquid phase a solution of 0.1 mole (20.3 g) of isophthalic acid chloride and 0.1 mole (20.3 g) of terephthalic acid chloride in 100 ml anhydrous 1,2-dichloroethane under continued intensive stirring for a period of 15 minutes, whereby the temperature of the dispersion is kept under 25° C. by cooling, if necessary, after which the stirring is continued for another 20 minutes. The polycondensation reaction was thus completed and the polyester formed was dissolved in the organic-liquid phase of the dispersion.

The two phases of the dispersion separated after a relatively short time without stirring. The polyester solution forming the organic liquid phase was then withdrawn and the polymer was precipitated with acetone and water, which were added slowly under constant stirring. The mixture was filtered and any existing ionic impurities were removed by washing with methanol, water and again methanol. Then, the polymer was dried in a vacuum drying cabinet at 80° C. until a constant weight was achieved to obtain 79.3 g (94.4% of theory) of a halogen-free polyester with an inherent viscosity of 0.91 dl/g.

The inherent viscosity was determined in a solution of 0.5 g polymer in 100 ml solvent (60% phenol, 40% tetrachloroethane) using an Ubbelohde viscosimeter (capillary constant 0.01) at 30° C.

EXAMPLE 7

In this example, a comparison process is described which contains exclusively water as the solvent in the aqueous phase. 0.2 mole (58 g) of 1,1-bis(4-hydroxyphenyl)-1-phenyl ethane in 700 ml of water and 0.415 mole (16.6 g) of sodium hydroxide were dissolved by heating to produce the aqueous phase. The addition of the phase transfer catalyst, the dispersion, the mixing with the organic liquid phase, as well as all the other steps of the process are effected in the same manner as in Example 6 to obtain 76 g (90.4% of theory) of a halogen-free, colorless polyester with an inherent viscosity of 0.68 dl/g (measured as in Example 1).

As can be seen, an advantageous increase of the inherent viscosity of about 34% (from 0.68 to 0.91 dl/g) can be achieved with the process of the invention over the comparative process of Example 7.

EXAMPLE 8

0.2 mole (70 g) of 9,9-bis-(4-hydroxyphenyl) fluorene (melting point 227°–229° C.) were dissolved in 400 ml of water, 100 ml ethanol, and 0.415 mole (16.6 g) of sodium hydroxide by heating for the production of the aqueous phase. After the solution had cooled a solution of 0.075 mole (4 g) of triethylbenzyl ammoniumchloride in 25 ml of water was added as a phase transfer catalyst. The dispersion, the mixing with the organic liquid phase, as well as all the other steps of the process were effected as in Example 6 to obtain 88 g (91.5% of theory) of a halogen-free colorless polyester with an inherent viscosity of 0.64 dl/g (measured as in Example 1).

Various modifications of the process of the invention may be made without departing from the spirit or scope thereof and it is to be understood that the invention is intended to be limited only as defined in the appended claims.

What I claim is:

1. In a process for the preparation of aromatic polyesters by a two phase, interfacial polycondensation wherein a fine dispersion is produced from an aqueous phase consisting of a diphenol, approximately an stoichiometric amount of an alkali metal hydroxide and a phase transfer catalyst in a mixture of water and an organic solubilizer and an organic phase of a solution of at least one aromatic dicarboxylic acid halide in a halogenated organic solvent with the polyester being dissolved in the organic phase, the improvement comprising using as the organic solubilizer an alkanol of 2 to 5 carbon atoms or an alkoxy alkanol of 2 to 5 carbon atoms.

2. The process of claim 1 wherein the solubilizer is an alkanol of 2 to 5 carbon atoms.

3. The process of claim 1 wherein the solubilizer is isopropanol.

4. The process of claim 1 wherein the solubilizer is ethanol.

* * * * *